(12) United States Patent
M'Raihi et al.

(10) Patent No.: US 6,226,382 B1
(45) Date of Patent: May 1, 2001

(54) METHOD FOR IMPLEMENTING A PRIVATE-KEY COMMUNICATION PROTOCOL BETWEEN TWO PROCESSING DEVICES

(75) Inventors: David M'Raihi; David Naccache, both of Paris (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 08/875,331
(22) PCT Filed: Dec. 26, 1995
(86) PCT No.: PCT/FR95/01735
  § 371 Date: Sep. 24, 1997
  § 102(e) Date: Sep. 24, 1997
(87) PCT Pub. No.: WO96/20461
  PCT Pub. Date: Jul. 4, 1996

(30) Foreign Application Priority Data

Feb. 28, 1994 (FR) .................................................. 94 15804

(51) Int. Cl.$^7$ ..................................................... H04K 1/00
(52) U.S. Cl. .............................................................. 380/28
(58) Field of Search ................................. 380/28, 30, 43, 380/44, 259, 170, 171, 172, 285

(56) References Cited

U.S. PATENT DOCUMENTS

| | | | |
|---|---|---|---|
| 4,549,308 | * 10/1985 | LoPinto ................................... | 455/26 |
| 4,748,668 | * 5/1988 | Shamir et al. ......................... | 380/28 |
| 4,956,863 | * 9/1990 | Goss ....................................... | 380/30 |
| 4,969,190 | * 11/1990 | Kazuo et al. ............................ | 380/43 |
| 5,825,886 | * 10/1998 | Adams et al. .......................... | 380/28 |

FOREIGN PATENT DOCUMENTS

| | | |
|---|---|---|
| WO 9118459 | * 11/1991 | (DE) . |
| 4107266 | 9/1992 | (DE) . |
| 0252499 | 1/1988 | (EP) . |
| 2566155 | 12/1985 | (FR) . |
| 9118459 | of 1991 | (WO) . |

OTHER PUBLICATIONS

Bruce Schneier, Applied Cryptography 2e, John Wiley, 1995.*
Joan Daemen, et. al. Block Cipher Based on Modular Arithmetic, SPRC Rome 1993.*
James Lee Massey, An Introduction to Contemporary Crytology, Proc. IEEE 76(5), 1988.*
Whitfield Diffie and Matin E. Hellman. New Directions in Cryptography, IEEE, Tran. on Information Theory, vol. IT–22, No. 6, Nov. 1976.*
Wayne Patterson, Mathematical Crytology, Rowman & Littlefield, 1987.*

* cited by examiner

Primary Examiner—Gail Hayes
Assistant Examiner—James Seal
(74) Attorney, Agent, or Firm—Roland Plottel

(57) ABSTRACT

A method for implementing private key protocols between two processing devices of which at least one is a portable storage medium. The devices are fitted with a digital processing circuit for performing modular calculation operations with a view to executing operations such as modular multiplication, the processing circuit is used to implement a private key encryption function consisting of a series of reversible operations comprising at least a combination of two operations, i.e. a modular calculation operation and a binary logic operation, and said function is applied either for encrypting or signing messages to be transmitted, or for decrypting received messages.

12 Claims, 2 Drawing Sheets

METHOD FOR IMPLEMENTING A PRIVATE-KEY COMMUNICATION PROTOCOL BETWEEN TWO PROCESSING DEVICES

The present invention relates to a process for implementing a communications protocol between two processing devices, at least one of which is a portable storage device such as a smart card.

BACKGROUND OF THE INVENTION

Data confidentiality is currently a major concern. It is clear that data in all their forms have intrinsic value that is often difficult to evaluate. Much of the wealth of a corporation or even a country resides in this growing volume of paper and electronic documents that condense its past, present, and even future activities. Paper documents that justified protection were hidden, concealed in locations that were made as difficult as possible to access. The spread of e-mail and electronic filing renews the problem and spurs a search for solutions to the problem.

Answers in this field are based on the concept of secret data being shared by a group of individuals at a given time. The processes implemented to date were based on simple operations that could be carried out on any device capable of elementary operations (binary addition, shifting, permutations, etc.).

The very nature of these processes implies lengthy and particularly painstaking design to build a machine whose logic is virtually error-free and whose errors are in any event never fatal. The confidentiality or secrecy of the data, on which all system security depends, would indeed be broken if the data transmitted between the devices were not kept secret, and this disclosure would then cause the security of the system to fail.

The design of effective protocols thus represents a particularly large investment in time and resources. Also, there is a relationship between maximum security and the quantity of information to be processed.

BRIEF SUMMARY OF THE INVENTION

The present invention solves this problem and in particular eliminates manufacturing shortcoming due to the fact that system reliability does not rest solely on the secrecy of the information held in this equipment.

According to the invention, it is proposed to divide this constraint between the secret held and the processing accomplished, namely the protocol itself.

For this purpose, according to the invention, the process enables secret-key cryptographic protocols securely contained in (hardware or software that are) dedicated to the performance of complex calculations (for example operations employing modular calculation) in the framework of public-key cryptographic protocols (DH, El Gamal, Schnorr, Fiat-Shamir, etc.).

Devices equipped with calculation resources for performing complex operations (such as modular calculation) are currently known; for example circuits such as the ST16CF54 circuit by the Societe Thomson, 83C852/5 by the Philips Company, or SLE 44CP200 can be cited.

According to the invention, such a resource is used judiciously, namely using operations that take little time but whose effects on data are effective in terms of encrypting and keeping secret the information processed. The principle is to combine operations that call simultaneously on resources dedicated to complex operations in the device itself, whatever its nature (simple application-oriented computer of the 8051 or 6805 type, processors of the 80x86 or 680x0 family, advanced processors Pentium, Alpha chips, SUN, or RISC), and parallel processors (Hypercube for example) combining cleartext information with a secret key to obtain an enciphered message that only a person possessing the secrecy protocals can decipher.

Thus, the invention proposes a highly securitized system wherein modular calculation can have a large number of bits, for example 80, 160, or 512 or more, requiring only the combination of two operations.

The present invention relates in particular to a process for implementing a secret-key protocol between two processing devices, at least one of which is a portable storage device, principally characterized by comprising the following stages:

equipping the devices of a digital processing circuit able to perform operations of the modular calculation type to carry out operations such as modular multiplication, using this processing circuit to implement a secret-key enciphering function composed of a sequence of reversible operations comprising at least the combination of two operations, one of the modular calculation type and the other in binary logic, applying this function either to messages intended for transmission to encipher or sign them, or to received messages to decipher them.

To process messages of any length, each message is first divided into q blocks×N bits.

According to another aspect of the present invention, the secret-key enciphering function comprises a combination of two operations, one of which is permutation that uses modular multiplication and the other an OR-exclusive logic operations where f is such that:

$$f(x)=(x \oplus K_2)* K_1 \bmod n$$

wherein x represents a block of N message bits $K_1$ and $K_2$ represent a first and second secret key with N bits, n is an odd number of N bits $\oplus$ is an OR-exclusive operation

* is a modulo multiplication operation n

According to another feature of the invention, the user can choose $K_1 \neq K_2$ or $K_1 = K_2$.

According to another feature of the invention, when a device is sending messages, it performs a first operation on the message by applying the chosen function f iteratively to each block $x_i$.

Preferably, an iteration number p equal to at least 4 is used.

Thus, according to a first embodiment, devices $A_j$ and $A_k$ communicate with each other according to the following protocol:

device $A_j$ enciphers each block x of message M previously divided into (q+1) blocks of N bits such that each enciphered block y of the message is such that:

$$E(x)=f^p(x) \oplus K \bmod n=y,$$

p being greater than or equal to 4, the device sends the (q+1) y blocks to device $A_k$, device $A_k$ carries out the following operation on each y:

$$D(y)=g^p(y) \oplus K \bmod n=x, \text{ to decipher block } y,$$

in order to decipher y and obtain x, the function g being the inverse function of f such that:

$$g(y)=(y*K^{-1} \bmod n) \oplus K,$$

y representing a block of N bits of the cipher.

The power p indicates that functions f and g are composed p times as follows: $f^p(x)=f(f(f \; f(x)) )$. Hence, function f is applied iteratively. The proposed number of iterations guarantees better security of the protocol. Practically speaking, hashing the message consists for example of carrying out the following steps:

$$E(x_i)=f^4(x_i) \oplus K \bmod n$$

(1) The cipher $y_1$ of the first block $x_1$ of the message is calculated: $y_1=E(x_1)$ (2) For the remainder of the $x_i$ blocks of the message, the following calculation is performed:

$y_i=E(x_i \oplus y_{i-1}) \oplus y_{i-1}$ and the last block is taken as the hashed value of the message.

According to another embodiment, when devices $A_j$ and $A_k$ communicate with each other, device $A_j$ first divides the message into q+1 blocks of N bits and places the blocks in two registers. One block $x_i$ of one message is placed in a first register and the next block $x_{i+1}$ is placed in the second register. When device $A_j$ sends a message, it enciphers this message with a cipher function f such that:

$$E(x_i, x_{i+1}) = f^p(x_i, x_{i+1})$$

with $f(x_i, x_{i+1})=y_i, y_{i+1}$
where $y_i=x_{i+1}$
$y_{i+1}=x_i \oplus ((y_i \oplus K_2) * K_1 \bmod n)$
The device sends the (q+1) y blocks to device $A_k$.
Device $A_k$ performs the following operation on each block $y_i$:

$$D(y_i, y_{i+1})=g^p(y_i, y_{i+1})$$

so as to decipher $(y_i, y_{i+1})$ and obtain $(x_i, x_{i+1})$, the function g being the inverse function of f, this function being defined by:

$$g(y_i, y_{i+1})=x_i, x_{i+1}$$

where $X_{i+1}=y_i$ and
$x_i = y_{i+1} \oplus ((x_{i+1} \oplus K_2) * K_1 \bmod n) = y_{i+1} \oplus ((y_i \oplus K_2) * K_1 \bmod n)$
device $A_k$ thus reconstituting the message.

The reverse application for deciphering is of exactly the same type as the direct application. Hence it is possible to construct a symmetric enciphering system by composing several functions f as above.

In this case, the number of iterations will be chosen to be greater than or equal to eight in order to give good security.

The protocol based on this function allowing a block x to be enciphered and a block y of the cipher to be deciphered will be the following:

$E(x)=f^8(x) \oplus K \bmod n=y$, to encipher block x,
$D(y)=g^8(y) \oplus K \bmod n=x$, to decipher block y, with g being the inverse of f as defined above, and y representing a block of N bits of the cipher.

The enciphering functions described above can be used to hash messages of any length.

A message is hashed by combining the block to enciphered block values and retaining only the last enciphered value which represents the hashed value of the message.

In practical terms, hashing a message consists of carrying out the following steps:

$$E(x_i, x_{i+1})=f^8(x_i, x_{i+1})$$

(1) The cipher $(y_1, y_2)$ of the first two blocks $(x_1, x_2)$ of the message is calculated: $y_1, y_2=E(x_1, x_2)$.

(2) For the rest of the pairs of blocks, $(x_i, x_{i+1})$ of the message, the following calculation is carried out:

$y_i, y_{i-1}=E(x_1 \oplus y_{i-2}, x_{i+1} \oplus y_{i-1}) \oplus (y_{i-2}, y_{i-1})$ and the last block is taken as the hashed value of the message.

The length N in bits of the modulo, the keys, and the blocks to be enciphered or hashed will preferably, depending on the devices used, consist of 80 bits or 160, 512, 640, 1024, or more. The number used as the modulo will be odd.

Preferably, the number $n=2^N-1$ will be used.

The portable devices will be smart cards or PCMCIA cards, badges, contactless cards, or any other device equipped with a security module.

The signals exchanged may be electrical signals or infrared signals or radio waves.

Other features and advantages of the invention will emerge more clearly from the description provided as an indication and without limitation having regard to the drawings wherein:

DETAILED DESCRIPTION OF THE INVENTION

Figure 1:
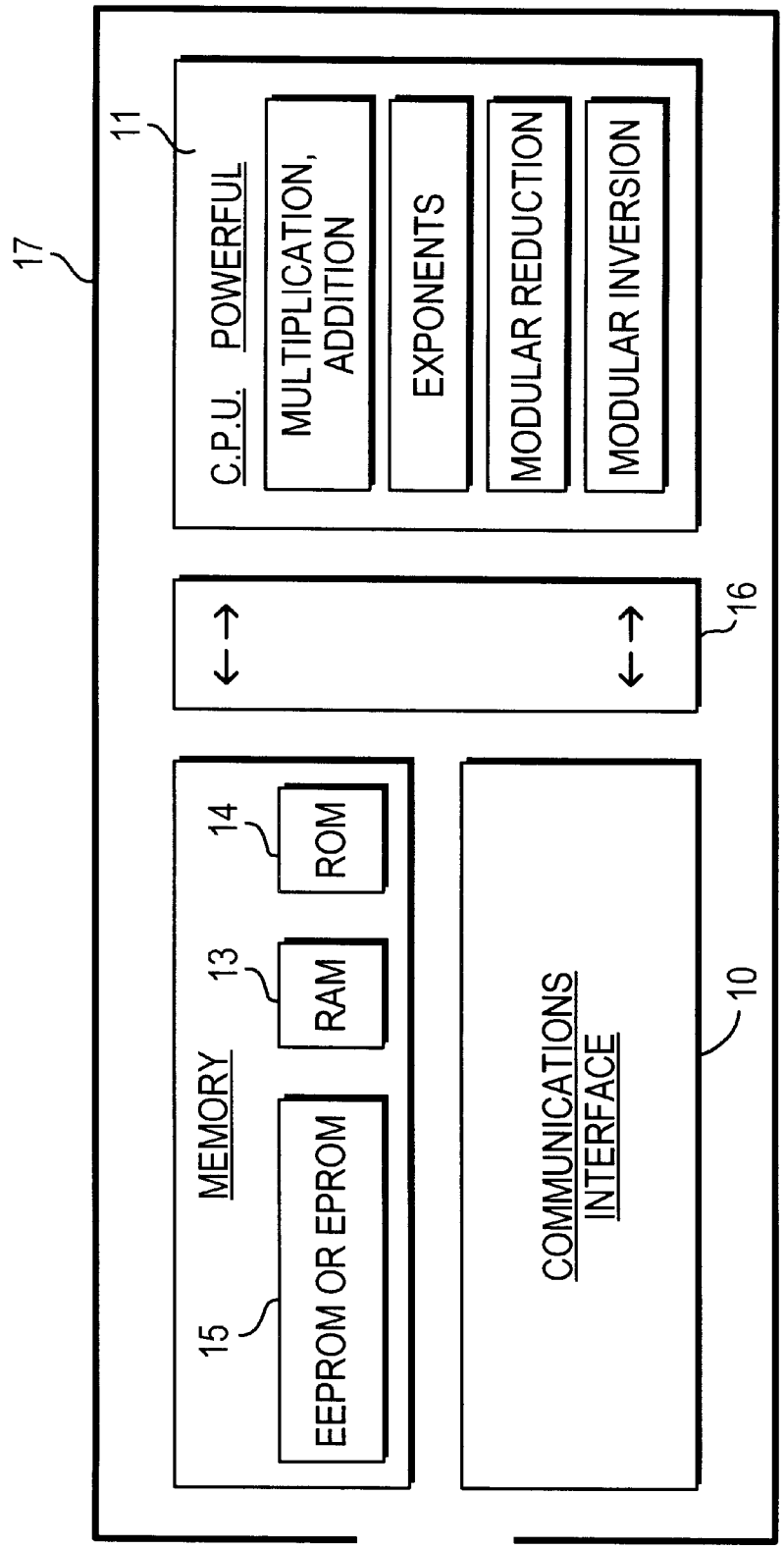
FIG. 1 is a diagram of a device implementing the process according to the present invention.

In the remainder of the description, for simplicity's sake, the case of a smart card will be taken as an example of the processing device.

According to the invention proposed, each smart card is composed of a processing unit CPU 11, a communications interface 10, a random-access memory (RAM) and/or a read-only memory (ROM) 14, and/or a read-only memory (generally reprogrammable) (EPROM or EEPROM) 15. Each card can encipher and/or decipher messages according to the procedures proposed.

The CPU unit 11 and/or ROM 14 of this smart card contain programs or calculation resources that allow arithmetical operations to be performed rapidly on large numbers, particularly multiplications, inverse calculations, and modular reductions. In known fashion, some of these operations can be grouped (for example modular reduction can be integrated directly into multiplication).

In the same way as for implementation of an algorithm such as DES, the RAM memory contains block x on N bits of message M to be enciphered. The E(E)PROM memory 15 contains keys K, $K_1$, and $K_2$.

In known fashion, the CPU unit 11 controls, via address and data buses 16, the communications interface 10 and the memory read and write operations 13, 14, and 15.

Each smart card is protected from the outside world by physical protections 17. These protections must be sufficient to prevent any unauthorized entity from obtaining the secret key K.

The techniques in commonest use today in this field are building the chip into a security module and equipping chips with devices capable of detecting changes in temperature and light as well as abnormal voltages and clock frequencies. Special (but known) design techniques such as scrambling the memory access are also used.

Figure 2:
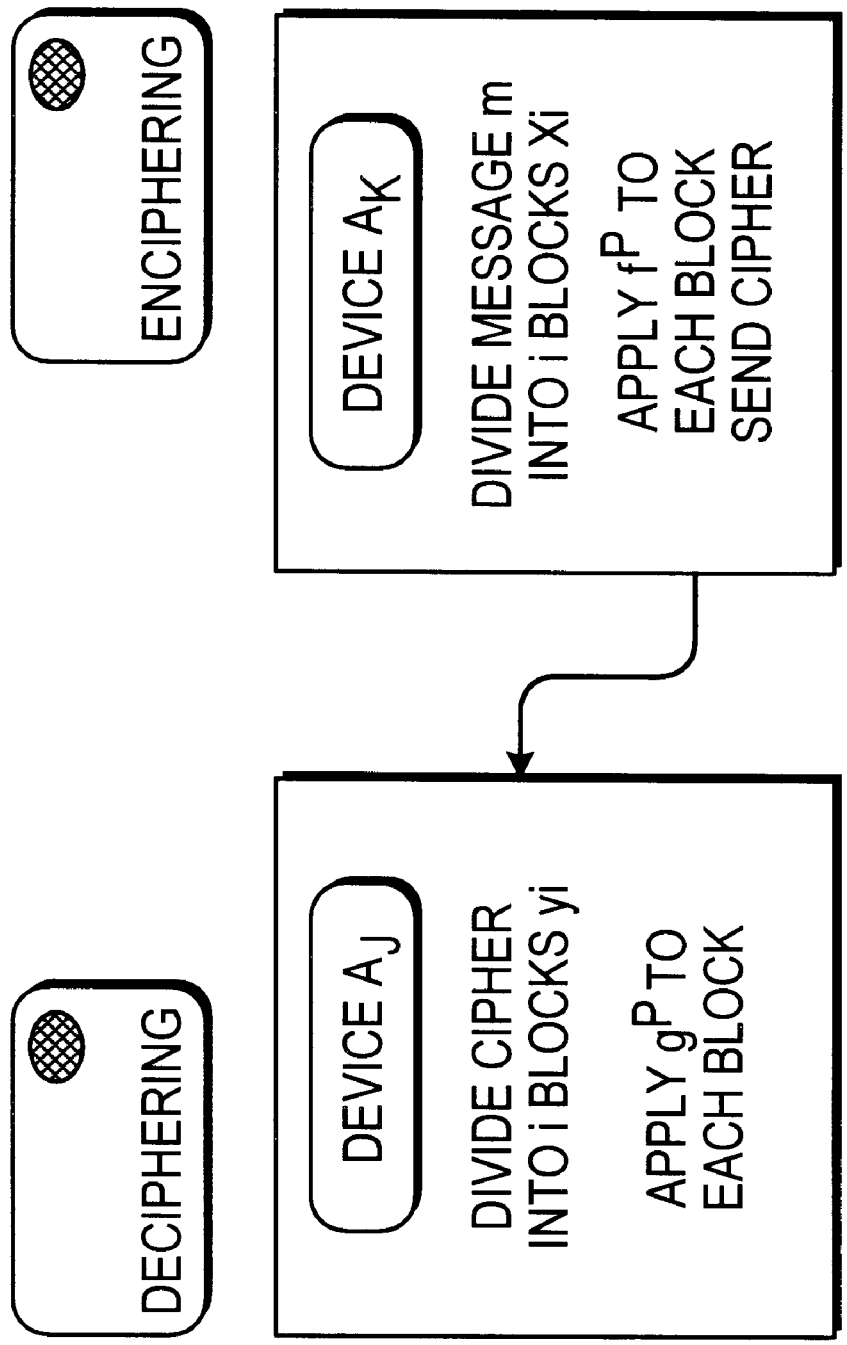
FIG. 2 is a diagram illustrating data transmitted between a device $A_j$ and another device $A_k$ using a digital processing circuit according to the invention during a message enciphering/deciphering phase.

As shown in FIG. 2 there are two devices $A_j$ and $A_k$.

A device utilizing a security module with the same functions as a smart card can carry out the enciphering and deciphering operations in the same manner.

Within the general framework of the proposed invention, implementation of a symmetrical enciphering algorithm employing resources normally used for public-key cryptographic operations is carried out by taking the following steps and exchanging at least the following signals between the card and the verification device which, according to the invention, can be another card:

First, the device $A_j$ enciphering a message of length L divides the message to obtain (q+1) blocks of N bits. If $L=(q*N+r)$ bits, with $r<N$, the device divides the message into q+1 blocks, namely q blocks of length N bits and one block of r bits.

It completes the (q+1) i'th block with zeros in order to have q+1 blocks of N bits, then it enciphers each block $x_i$ by performing the following calculation:

$$E(x_i)=f^4(x_i)\oplus K \bmod n=y_i$$

with $f(x_i)=(x_i\oplus K)* K \bmod n$

K representing the secret key over N bits n being an odd number of N bits, and $\oplus$ being the exclusive OR and * the multiplication modulo n It then sends the (q+1) $y_i$ blocks of the cipher to the deciphering device.

The message deciphering device $A_k$ makes the following calculation on each block $y_i$:

$$D(y_i)=g^4(y_i)\oplus K \bmod n=x_i, \text{ to decipher block } y_i,$$

with $g(y)=(y*K^{-1} \bmod n)\oplus K$.

It finally reconstitutes the message $M=x_1|x_2|\ldots|x_{q+1}$

A second variant of the present invention has the objective of offering a second symmetrical enciphering embodiment calling on resources normally used for public-key cryptography, working on two registers of N bits containing the blocks of the message to be enciphered.

The device enciphering a message of length L divides it as described hereinabove.

For a message of length $L=(q*N+r)$ bits, with $r<N$, it divides this message into q+1 blocks, namely q blocks of length N bits and one block of r bits. It completes the (q+1) i'th block with zeros, and enciphers each block $x_i$ using the following calculation:

$$E(x_i, x_{i+1})=f^8(x_i, x_{i+1})$$

with: $f(x_i, x_{i+1})=y_i, y_{i+1}$ where $y_i=x_{i+1}$ $y_{i+1}=x\oplus((y_i\oplus K_2)* K_1 \bmod n)$ $K_1$ and $K_2$ representing the secret keys over N bits n being an odd number of N bits, and $\oplus$ being the exclusive OR and * the multiplication modulo n It then sends the (q+1) $y_i$ blocks of the cipher to the deciphering device.

The device deciphering the message makes the following calculation on each block $y_i$:

$$D(y_i,y_{i+1})=g^8(y_i, y_{i+1})$$

with: $g(y_i, y_{i+1})=x_i, x_{i+1}$ where $x_{i+1}=y_i$ $x_i=y_{i+1}\oplus((x_{i+1}\oplus K_2)* K_1 \bmod n)=y_{i+1}\oplus((y_i\oplus K_2)*K_1 \bmod n)$ Finally it reconstitutes the message $M=x_1|x_2|\ldots x_{i+1}$ As an example, for better understanding of the processing in the case where two interactions were performed on function f, one would have:

$$f^2(x_i,x_{i+1})=f(x_{i+1}, x_i\oplus((x_{i+1}\oplus K_2)*K_1 \bmod n)=y_i, y_{i+1}=(x_i\oplus((x_{i+1}\oplus K_2)*K_1 \bmod n, (x_{i+1}\oplus((y_i\oplus K_2)*K_1 \bmod n)$$

The process according to the invention also allows messages to be hashed in order for example to apply it to calculating electronic signatures or implementing secrete-key protocols as defined above. For example, the two algorithm-enciphering functions described above would be used to hash messages in the following manner:

According to a first variant: $E(x_i)=f^4(x_i)\oplus K \bmod n$ (1) The cipher $y_1$ of the first block $x_1$ of the message is calculated: $y_1=E(x_1)$ (2) For the rest of the blocks $x_1$ of the message, the following calculation is made: $y_i=E(x_i\oplus y_{i-1})\oplus y_{i-1}$ and the last block is taken as the hashed value of the message.

According to a second variant: $E(x_i, x_{i+1})=f^8(x_i, x_{i+1})$ (1) The cipher $(y_1, y_2)$ of the first two blocks $(x_1, x_2)$ of the message is calculated: $y_1, y_2=E(x_1, x_2)$ (2) For the rest of the pairs of blocks $(x_i, x_{i+1})$ of the message, the following calculation is performed:

What is claimed is:

1. A process for implementing a secret key protocol between first and second processing devices (Aj, Ak) wherein each device includes a digital processing circuit to perform modular calculations, comprising the steps of:

implementing in said processing circuit a secret key enciphering function composed of a sequence of reversable operations comprising at least the combination of two operations, one of the modular calculation type and the other in binary logic, applying said function either to outgoing messages to encipher them, or to incoming messages to decipher them, effecting in said digital processing circuit a dividing of said messages (m) into blocks (x) of N bits prior to said applying step and then processing said divided message in accordance with said applied functions, and said sequence of operations comprises at least a combination of two operations, one of which is a permutation using modular multiplication and the other an OR-exclusive logic operation, this combination being defined by a secret-key enciphering function f such that:

$$f(x)=(x\oplus K_2)*K_1 \bmod n$$

wherein:

x represents a block of N bits of the message, $K_1$ and $K_2$ represent a first and a second secret key over N bits, n is an odd number of N bits, ⊕ is an exclusive OR operation.,

* is a multiplication modulo n operation.

2. Process according to claim 1, characterized in that, when a device sends messages, it performs a first action on the message (m), consisting of applying the function f iteratively to each block $x_i$.

3. Process according to claim 1, characterized in that the devices communicate with each other according to the following protocol:

the first device ($A_j$) divides the message (m) into (q+1) blocks of N bits said first device ($A_j$) enciphers each block x of the message such that the enciphered block y of the message is such that:

$$E(x)=f^p(x) \oplus K \bmod n = y,$$

p being an iteration number, the first device sends the (q+1) y blocks to the second device ($A_k$)

the second device ($A_k$) carries out the following operation on each y:

$D(y)=g^p(y) \oplus K \bmod n = x$, to decipher block y, in order to decipher y and obtain x, the function g being the inverse function of f such that:

$$g(y)=(y * K^{-1} \bmod n) \oplus K,$$

y representing a block of N bits of the cipher.

4. Process according to claim 1, characterized in that in the first device ($A_j$) the message (m) is divided into (q+1) blocks (x) of N bits, in that a block $x_i$ of one message is placed in a first register, the next block $x_{i+1}$ is placed in a second register, and the device sends the enciphered messages after the operation of applying the function f such that $$E(x_i, x_{i+1}) = f^p(x_i, x_{i+1})$$

where p being an iteration number
with f ($x_i$, $x_{i+1}$)=$y_i$, $y_{i+1}$
where $y_i = x_{i+1}$
$y_{i+1} = x_i \oplus ((y_i \oplus K_2) * K_1 \bmod n)$
the first device sends the (q+1) y blocks to the second device ($A_k$), and the second device ($A_k$) performs the following operation on each block $y_i$:

$$D(y_i, y_{i+1}) = g^p(y_i, y_{i+1})$$

so as to decipher ($y_i$, $y_{i+1}$) and obtain ($x_i$, $x_{i+1}$), the function g being the inverse function of f, this function being defined by:

$$g(y_i, y_{i+1}) = x_i, x_{i+1}$$

where $X_{i+1} = y_i$
$x_i = y_{i+1} \oplus ((x_{i+1} \oplus K_2) * K_1 \bmod n) = y_{i+1} \oplus ((y_i \oplus K_2) * K_1 \bmod n)$
whereby the second device ($A_k$) thus reconstituting the message.

5. Process according to claim 4, characterized in that the processing circuit is used to hash the message and in that, when the first device ($A_j$) hashes a message M of length L, the circuit performs the following steps:

$$E(x_i, x_{i+1}) = f^8(x_i, x_{i+1})$$

(1) The cipher ($y_1$, $y_2$) of the first two blocks ($x_1$, $x_2$) of the message is calculated: $y_1$, $y_2$=E($x_1$, $x_1$).

(2) For the rest of the pairs of blocks ($x_i$, $x_{i+1}$) of the message, the following calculation is carried out:
$y_i$, $y_{i+1}$=E ($x_i \oplus y_{i-2}$, $x_{i+1} \oplus y_{i-1}$)$\oplus$($y_{i-2}$, $y_{i-1}$) and the last block is taken as the hashed value of the message.

6. Process according to claim 1, including generating a hashed value of the message (m) and in that when the first device ($A_j$) hashes the message (M) of length L, the following steps are carried out $$E(x_i) = f^p(x_i) \oplus K \bmod n$$

wherein p is an iteration number;

(1) The cipher $y_1$ of the first block $x_1$ of the message (m) is calculated: $y_1$=E($x_1$)

(2) For the rest of the blocks $x_i$ of the message, the following calculation is performed:

$y_i$=E($x_i \oplus y_{i+1}$)$\oplus y_{i-1}$ and the last block is taken as the hashed value of the message.

7. Process according to claim 1, characterized in that the modular calculation involves a large number.

8. Process according to claim 1, characterized in that the devices are smart cards, PCMCIA cards, badges, contactless cards, or any other portable apparatus or device equipped with a security module possessing the same functions as said portable devices.

9. Process according to claim 1, characterized in that communication between each device is effected by exchanging radio waves or infrared signals.

10. A process for implementing a secrete-key protocol between two processing devices (Aj, Ak), at least one of them being a portable storage device, comprising the following steps:

equipping the devices with a digital processing circuit able to perform operations of the modular calculation type to carry out operations, using this processing circuit to implement a secret-key enciphering function composed of a sequence of reversible operations comprising at least the combination of two operations, one of the modular calculation type and the other in binary logic, applying this function either to messages for transmission to encipher them, or to received messages to decipher them, wherein, in one device the message is divided into (q+1) blocks of N bits, in that a block $x_i$ of one message is placed in a first register, the next block $x_{i+1}$ is placed in a second register, and the device sends the enciphered messages after the operation consisting of applying a function f such that E($x_i$, $x_{i+1}$)=$f^p$($x_i$, $x_{i+1}$)
with f ($x_i$, $x_{i+1}$)=$y_i$, $y_{i+1}$
where $y_i = x_{i+1}$
and p being and iteration number $$y_{i+1} = x_i \oplus ((y_i \oplus K_2) * K_1 \bmod n)$$

the one device sends the (q+1) y blocks to the other device (Ak), the other device ($A_k$) performs the following operation on each block $y_i$:

$$D(y_i, y_{i+1}) = g^p(y_i, y_{i+1})$$

so as to decipher ($y_i$, $y_{i+1}$) and obtain ($x_i$, $x_{i+1}$), the function g being the inverse function of f, this function being defined by:

$$g(y_i, y_{i+1}) = x_i, x_{i+1}$$

where $x_{i+1}=y_i$
$x_i=y_{i+1}\oplus((x_{i+1}\oplus K_2)*K_1 \bmod n)=y_{i+1}\oplus((y_i\oplus K_2)*K_1 \bmod n)$
whereby the other device ($A_k$) thus reconstituting the message.

11. The process according to claim 10, wherein the processing circuit is used to hash the message and in that, when the one device ($A_j$) hashes a message M of length L, the circuit performs the following steps:

$$E(x_i, x_{i+1})=f^8(x_i,x_{i+1})$$

(1) the cipher ($y_1$, $y_2$) of the first two blocks ($x_i$, $X_2$) of the message is calculated: $y_1, y_2=E(x_1, x_1)$,
(2) for the rest of the pairs of blocks ($x_i$, $x_{i+1}$) of the message, the following calculation is carried out: $y_i, y_{i+1}=E(x_i\oplus y_{i-2}, x_{i+1}\oplus y_{i-1})\oplus(y_{i-2}, y_{i-1})$, and
(3) the last block is taken as the hashed value of the message.

12. Process according to claim 3 or 4 or 6 or 8 or 10, characterized in that the iteration p is greater than or equal to 4.

* * * * *